(No Model.)
E. L. PACKER.
BUCKLE.
No. 279,424. Patented June 12, 1883.
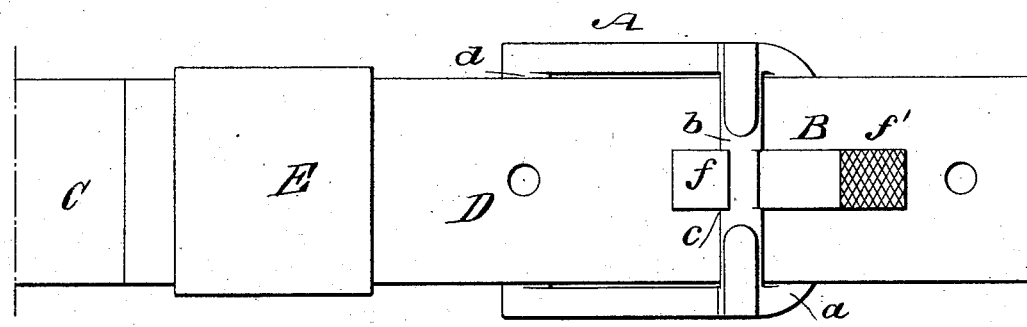
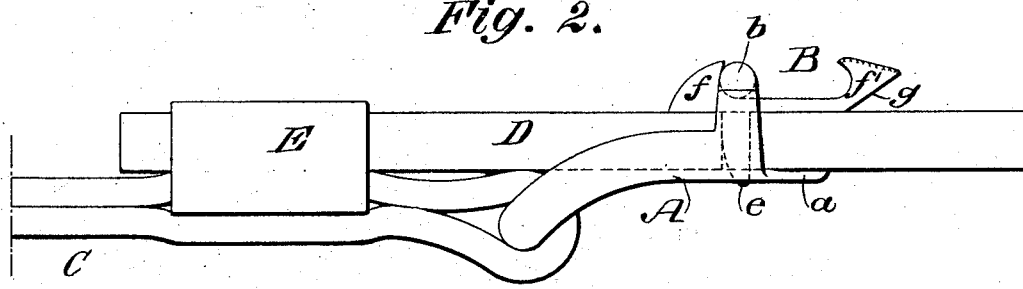
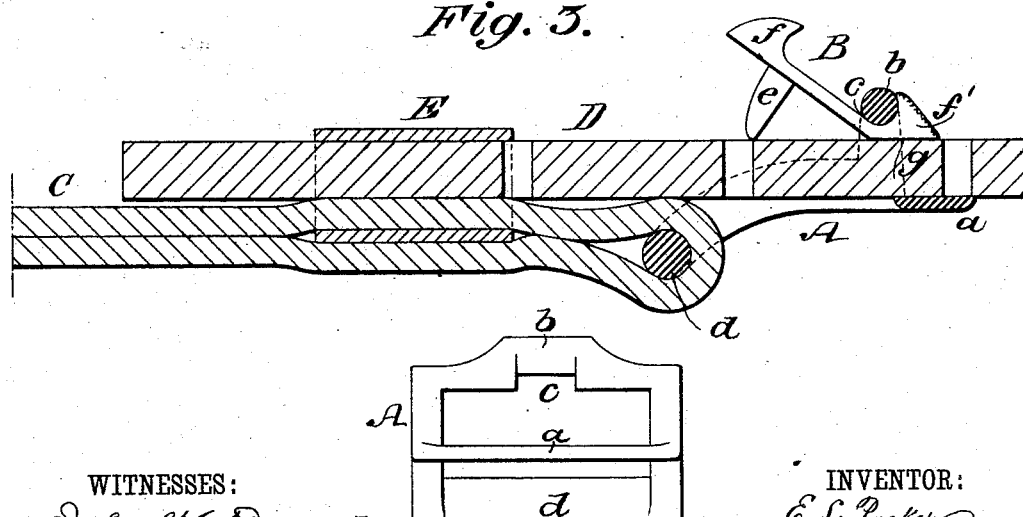
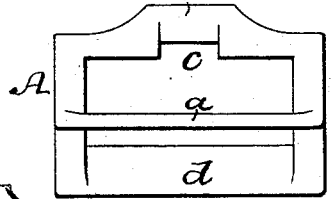
WITNESSES:
John H. Deemer
C. Sedgwick
INVENTOR:
E. L. Packer
BY Munn & Co
ATTORNEYS.

UNITED STATES PATENT OFFICE.

EZRA L. PACKER, OF TOULON, ILLINOIS.

BUCKLE.

SPECIFICATION forming part of Letters Patent No. 279,424, dated June 12, 1883.

Application filed April 6, 1883. (No model.)

*To all whom it may concern:*

Be it known that I, EZRA L. PACKER, of Toulon, in the county of Stark and State of Illinois, have invented a new and Improved Tug-Buckle for Harnesses, of which the following is a full, clear, and exact description.

My invention consists of a buckle composed of a suitable frame and sliding and tilting dog arranged in such manner that the tug may be easily lengthened and shortened without bending the tug, the tug being held with great security by the dog and frame.

Reference is to be had to the accompanying drawings, forming part of this specification, in which similar letters of reference indicate corresponding parts in all the figures.

Figure 1 is a plan view of a tug having my new and improved buckle applied thereto. Fig. 2 is a side elevation of the same. Fig. 3 is a sectional elevation, showing the dog raised for releasing the tug; and Fig. 4 is a front elevation of the buckle-frame.

A represents the frame of my new and improved buckle, to which the hame-tug C is attached in the ordinary way by the cross-piece $d$.

B represents the dog for holding the tug D. The frame A is formed with the inner cross-piece, $a$, and outer cross-piece, $b$, between which the tug D passes, and the outer cross-piece, $b$, is formed in the center with the notch $c$, of a width and depth equal to the width and depth of the central portion of the dog B, and in which notch the dog is held, as clearly shown in Figs. 1 and 3. The dog B is formed upon its under side with the tongue $e$, that is adapted to pass down through the holes in the tug D for holding it, and upon the upper side the dog is formed with the stop projections or lugs $f f'$, that limit the movement of the dog backward and forward under the cross-piece $b$, and at its rear end the dog is beveled, as shown at $g$, to permit the dog to be tilted up at its forward end to the position shown in Fig. 3 for raising the prong $e$ out from the hole in the tug D, the projections $f f'$ being sufficient distance apart relative to the length of the tongue $e$ to permit its being raised entirely out of the hole in the tug, as shown in said figure.

In use, the tug D having been put in place in the buckle and its forward end passed through the keeper E, to shorten it the tug has simply first to be shoved forward through the frame of the buckle until the projection or stop $f'$ of the dog B strikes the cross-piece $b$ of the frame A, which will cause the forward end of the dog to be tilted up to the position shown in Fig. 3, lifting the tongue $e$ out of the hole in the tug. The tug will now be shoved along until the hole in the tug at which it is to be held comes in line with the lower end of the tongue $e$. The tug is now simply to be drawn backward, whereupon the dog will automatically drop, entering the tongue $e$ into the hole in the tug, and the dog will now slide backward with the tug until the projection or stop $f$ of the dog comes against the cross-piece $b$, which will cause the dog to hold the tug. To lengthen the tug, the dog will be first shoved forward to release the tongue $e$, as above described. The thumb will then be placed upon the rear end of the dog and the tug drawn backward until the desired hole comes in line with the tongue $e$. The thumb will now be removed from the rear end of the dog, whereupon the dog will drop and cause the tongue $e$ to enter the hole, the same as in shortening the tug. In this manner it will be seen that the labor of lengthening and shortening the tug is made very easy, and that all bending of the tug is avoided, and it will also be seen that the lower end of the tongue, when the dog is drawn backward, comes against the plate $a$, so that the tug will be held with great security. Besides, the buckle is cheap, strong, and not liable to get out of order.

In case it is desired to permanently connect the dog B to the frame A, a plate may be riveted or otherwise secured to the upper ends or side of the projections $f f'$, so that the cross-piece $b$ will be practically inclosed in a slot.

Having thus described my invention, I claim as new and desire to secure by Letters Patent—

1. As an improved article of manufacture, the buckle herein shown and described, consisting of the frame A, having the cross-pieces $a b$, in combination with the sliding and tilting dog B, provided with the tongue $e$, substantially as and for the purposes set forth.

2. The cross-piece $b$ of the frame A, having the central notch, $c$, in combination with the dog B, having stops $f f'$, bevel $g$, and tongue $e$, substantially as and for the purposes described.

EZRA L. PACKER.

Witnesses:
ROBERT TELL,
JEREMIAH LYON.